United States Patent
Goodman et al.

(10) Patent No.: US 7,117,144 B2
(45) Date of Patent: Oct. 3, 2006

(54) SPELL CHECKING FOR TEXT INPUT VIA REDUCED KEYPAD KEYS

(75) Inventors: Joshua T. Goodman, Redmond, WA (US); Gina D. Venolia, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1009 days.

(21) Appl. No.: 09/823,580

(22) Filed: Mar. 31, 2001

(65) Prior Publication Data

US 2002/0188448 A1    Dec. 12, 2002

(51) Int. Cl.
*G06F 17/28* (2006.01)
*G06F 17/21* (2006.01)

(52) U.S. Cl. .............................. 704/9; 704/10; 715/533

(58) Field of Classification Search .................... 704/9, 704/10, 1; 715/529, 534, 533
See application file for complete search history.

(56) References Cited

U.S. PATENT DOCUMENTS

| | | | |
|---|---|---|---|
| 5,610,812 A * | 3/1997 | Schabes et al. | 704/9 |
| 5,627,980 A | 5/1997 | Schilit et al. | 395/353 |
| 5,818,437 A * | 10/1998 | Grover et al. | 715/811 |
| 5,828,991 A * | 10/1998 | Skiena et al. | 704/9 |
| 5,953,541 A * | 9/1999 | King et al. | 710/67 |
| 5,956,739 A * | 9/1999 | Golding et al. | 715/533 |
| 6,002,390 A | 12/1999 | Masui | 345/173 |
| 6,005,495 A * | 12/1999 | Connolly et al. | 341/22 |
| 6,011,544 A | 1/2000 | Sato | 345/168 |
| 6,018,736 A * | 1/2000 | Gilai et al. | 707/6 |

(Continued)

OTHER PUBLICATIONS

F. Jelinek, "Self Organized Language Modeling for Speech Recognition", Language Processing for Speech Recognition, pp. 450-503.
K. Seymore et al., "Scalable Backoff Language Models", In Proc. ICSLP, vol. 1, pp. 232-235, Philadelphia, 1996.

(Continued)

*Primary Examiner*—David Hudspeth
*Assistant Examiner*—James S. Wozniak
(74) *Attorney, Agent, or Firm*—Linda P. Ji; Westman, Champlin & Kelly

(57) ABSTRACT

Spell checking of a word corresponding to a typically numeric key sequence entered by the user using numeric keys or other reduced keyboards is disclosed. The spell checking is based on comparisons of the entered number sequences with number sequences within a dictionary, or number sequences for words within a dictionary. For a given entered number sequence, the number sequences of words in a dictionary, or the number sequences in the dictionary, are compared. Those having costs according to a metric not greater than a maximum cost are presented as the potential intended word of the user. The metric may be the minimum edit distance, for example.

31 Claims, 8 Drawing Sheets

U.S. PATENT DOCUMENTS

| | | | |
|---|---|---|---|
| 6,169,538 B1 | 1/2001 | Nowlan et al. | 345/168 |
| 6,204,848 B1* | 3/2001 | Nowlan et al. | 715/810 |
| 6,271,835 B1 | 8/2001 | Hoeksma | 345/168 |
| 6,307,548 B1* | 10/2001 | Flinchem et al. | 345/811 |
| 6,415,248 B1* | 7/2002 | Bangalore et al. | 704/1 |
| 6,556,841 B1* | 4/2003 | Yu | 715/533 |
| 6,654,733 B1* | 11/2003 | Goodman et al. | 706/52 |
| 6,677,932 B1* | 1/2004 | Westerman | 345/173 |
| 6,741,235 B1 | 5/2004 | Goren | 345/173 |
| 6,782,357 B1 | 8/2004 | Goodman et al. | 704/9 |
| 2002/0126097 A1* | 9/2002 | Savolainen | 345/168 |
| 2002/0180689 A1 | 12/2002 | Venolia | 345/156 |
| 2003/0011574 A1 | 1/2003 | Goodman | 345/172 |
| 2003/0023420 A1 | 1/2003 | Goodman | 704/1 |

OTHER PUBLICATIONS

Stolcke, "Entropy-based Pruning of Backoff Language Models", Proc. DRAPA News Transcription and Understanding Workshop, pp. 270-274, Lansdowne, VA.

Chen et al., "An Empirical Study of Smoothing Techniques for Language Modeling", TR-10-98, Computer Science Group, pp. 1-64, Harvard University, 1998.

Lehikoinen et al., "BinScroll: A Rapid Selection Technique for Alphanumeric Lists", CHI 2000, pp. 261-262, Apr. 1-6, 2000.

Ahlberg, et al., "The Alphaslider: A Compact and Rapid Selector", Proc. CHI 94, p. 365-371.

* cited by examiner

SPELL CHECKING FOR TEXT INPUT VIA REDUCED KEYPAD KEYS

FIELD OF THE INVENTION

The invention relates generally to text input using a reduced keypad, such as numeric keys, and more particularly to spell checking words corresponding to key sequences entered using these keys.

BACKGROUND OF THE INVENTION

Mobile phones, and other devices having only a limited set of input keys, have become increasingly popular. While the numeric keys of a mobile phone are adequate for entering phone numbers and other number sequences, they are difficult to use for entering text. A standard keyboard has keys for both letters and numbers, whereas the numeric keys of a mobile phone have no intuitive way by which to enter text. Text may need to be entered on such devices, for example, to associate a name with a phone number in an address book. Since mobile phones and other such devices are becoming more popular for accessing the Internet, such as to browse web sites and send and receive email, this limitation will likely become increasingly acute in the future.

Currently, there are two common ways to achieve text input using numeric keys, a multiple-tap approach, and a single-tap approach. With the multiple-tap approach, a user presses a numeric key a number of times to enter the desired letter, where most of the numeric keys are mapped to three or four letters of the alphabet. For example, the two key is usually mapped to the letters A, B, and C. If the user presses the two key once, the letter A is entered. If the user presses the two key twice, the letter B is entered, and if the user presses the two key three times, the letter C is entered. Pauses between entry of successive letters of a word are sometimes necessary so that the device knows when to advance the cursor to the next letter-entry position. For example, to enter the word "cab," the user presses the two key three times to enter the letter C, pauses, presses the two key once to enter the letter A, pauses again, and presses the two key twice to enter the letter B. To enter numbers, symbols, or switch between upper-and lower-case letters, typically other keys that are present on numeric keypads, such as the pound ("#") and asterisk ("*") keys, among other keys, are mapped for these purposes.

While the multiple-tap approach is usable in that users can enter any word using only the numeric keys, it is disadvantageous for quick and intuitive text entry. A word such as "cab" that only requires three key presses on a standard keyboard, one for each letter, requires six key presses on numeric keys using the multiple-tap approach. As compared to using a standard keyboard, using numeric keys with the multiple-tap approach to achieve text entry means that the user presses many keys even for short messages. Furthermore, errors can be frequent. For example, if the user intends to enter the letter B, but pauses too long between the first and the second presses of the two key, two letters A will be entered instead. The device in this case interprets the pause as the user having finished with the current letter entry, an A, and proceeds to the next letter-entry position, where it also enters an A.

Another approach to text entry using numeric keys is the single-tap approach, which is also known as the Tegic approach, for the company that popularized it. Under the single-tap approach, the user presses the numeric key associated with the desired letter once, even though the numeric key may be mapped to three or four different letters. When the user is finished entering a number sequence for a word, the device attempts to discern the word that the user intended to enter, based on the number sequence. Each number sequence is mapped to a common word that corresponds to the sequence. For example, the number sequence 43556 can potentially correspond to any five-letter word having a first letter G, H, or I, since the four key is usually mapped to these letters. Similarly, the sequence potentially corresponds to any five-letter word having a second letter D, E, or F, a third and fourth letter selected from the letters J, K, and L, and a fifth letter M, N, or O, since the three, five, and six keys are usually mapped to these respective letters. However, because the most common five-letter word corresponding to the number sequence 43556 is the word "hello," the single-tap approach always enters this word when the user presses the four, three, five, five, and six keys in succession to input this number sequence.

The single-tap approach has advantages over the multiple-tap approach, but presents new disadvantages. Advantageously, the single-tap approach ensures that the user only has to press the same number of keys as the number of letters in a desired word. For example, the multiple-tap approach requires the user to press the two key six times to enter the word "cab." Conversely, the single-tap approach potentially only requires the user to press the two key three times to enter this word, assuming that the number sequence 222 is mapped to the word "cab." Therefore, the single-tap approach is more key-efficient than the multiple-tap approach for text entry using numeric keys. It is as key-efficient as using a standard keyboard that has a single key for each letter.

The single-tap approach is disadvantageous in that the word mapped to a given number sequence may not be the word the user intended to enter by inputting the sequence. For example, the numeric key sequence 7333 corresponds to both the words "seed" and "reed." Because only one word is mapped to each numeric key sequence, the word "seed" may be entered when the user keys in the numeric key sequence 7333, whereas the user may have intended to enter the word "reed." The single-tap approach is primarily useful where there is only one unique word for a given numeric key sequence, or, if there are a number of words for a given sequence, when the user wishes to input the most common word associated with the sequence. For entry of uncommon words corresponding to number sequences to which words that are more common also correspond, the approach is less useful. The single-tap approach is also not useful for the entry of all but the most common proper names, and scientific, legal, medical, and other specialized terms, all of which will not usually be mapped to number sequences. Where the word mapped by the single-tap approach is not the intended word, text entry may revert back to the multiple-tap approach, or to an error-correction mode. Ultimate text entry of the intended word may then require more keystrokes than if the user had started with the multiple-tap approach.

The problem of a given number sequence mapping to multiple words is referred to as the ambiguity limitation of the single-tap approach. Some prior art approaches exist to overcome this limitation by attempting to disambiguate the intended word when the user enters a number sequence that corresponds to more than one word. One disambiguation approach is to show the user a number of different words that correspond to the entered number sequence, in order of decreasing frequency of use—that is, in decreasing order of how common the different words are. The user then selects a word from the list. This approach is described in detail in U.S. Pat. No. 5,953,541, issued on Sep. 14, 1999. The primary disadvantage to this disambiguation approach is that after the user has entered the number sequence, he or she is forced to expend additional effort reviewing the presented list of words, and selecting the desired word from the list. While this may be better than forcing the user back into a multiple-tap approach to reenter the intended word with additional keystrokes, it still can considerably delay text entry using numeric keys.

An improvement to this disambiguation approach is described in detail in U.S. Pat. No. 6,011,554, issued on Jan. 4, 2000, and which is a continuation-in-part of the patent application that issued as U.S. Pat. No. 5,818,437 on Oct. 6, 1998. Under the improved disambiguation approach, the word corresponding to the entered number sequence that has the highest frequency of use is automatically selected by default when the user begins to enter a new number sequence using the numeric keys. This is advantageous because, if the user's intended words are those having the highest frequency of use for the entered number sequences, the user does not have to select them from presented lists. However, at best occasionally, and at worst frequently, the user still has to select the desired word from a list, when the desired word is not the word with the highest frequency of use for the entered number sequence. This means that text entry delays are still inevitable even with this improved disambiguation approach.

Perhaps the primary disadvantage to either the original disambiguation approach, or the improved disambiguation approach, is that the order of words presented in the list intrinsically depends on only the current number sequence entered by the user. The described disambiguation approaches only consider the frequency of use of the words that correspond to the current number sequence in ordering the list of words from which the user can select a desired word. For a given number sequence entered, the list of words presented to the user is always the same. Therefore, using one of the previously described examples, when the user enters the number sequence 7333, if the word "seed," which corresponds to this number sequence, has a higher frequency of use than the word "reed," which also corresponds to the sequence, the former word is always displayed in the list ahead of the latter word. The list of words does not take into account that in some situations the word "reed" is a better choice than the word "seed." As an example, if the user is entering the sentence "The first reed is shorter than the second reed," the device will present the user with the word "seed" for both the first and the second time the user enters in the sequence 7333 for the intended word "reed." The device does not discern that if the user has most recently selected the word "reed" for the sequence 7333, the user more likely wishes to enter this word, and not "seed," when entering the sequence again.

Another disadvantage of these approaches is that they do not take into account the user making a mistake when entering in a word using the numeric keys. For example, the user may have intended to enter the word "relief" using the single-tap approach. The user should have entered the number sequence 735433, but instead entered the number sequence 735343, which corresponds to the incorrect spelling "releif" of this word. When the current single-tap approaches encounter the number sequence 735343, they may map the number sequence to an actual word that has this number sequence. Because the single-tap approach is an ambiguous manner by which to enter words, the number sequence may correspond to other words, besides the incorrect spelling of the word "relief." For example, the number sequence 735343 corresponds to an alternative name Peleid for the Greek mythological hero Achilles. Even though it is more likely that the user had intended to enter the word "relief," and just misspelled the word, the single-tap approach, if the word "Peleid" is in its dictionary, is likely to propose this word as the word the user had intended to enter.

Furthermore, current spell checking approaches, such as those used in word processing programs, do not operate well in the ambiguous environment of text entry using numeric keys. These spell checking approaches operate on the letters of the word, and therefore most assume, at least implicitly, that the word has been entered using a standard keyboard having a unique key for each letter of the alphabet. As an example, sophisticated spell checking approaches may determine that when the user has entered the nonsensical word "xome," he or she really meant to enter the word "come." This is because the X key is next to the C key in a standard keyboard, such that the user may have accidentally, and easily, pressed the latter key instead of the former key.

These sophisticated spell checking approaches do not carry over very well to text input entered using numeric keys via the single-tap approach. For example, the non-word "xome" has the number sequence 9663, whereas the word "come" has the number sequence 2663. Determining that the user had entered the word "come" instead of the word "xome" in this case is likely incorrect, since the 2 key is far away from the 9 key on most numeric keypads. For example, the user is more likely to have intended to enter the number sequence 8663, corresponding to the word "tome." Furthermore, the single-tap approach in the first instance is likely to map the entered number sequence 9663 to the common word "wood," such that the spell checking approach would never even be given the opportunity to provide alternative words.

The ambiguous nature of the single-tap approach to text entry using numeric keys ultimately renders traditional spell checking approaches not very useful to correct spelling mistakes. The spell checking approaches may make assumptions about likely spelling errors, based on mistakenly pressed keys, that are inapplicable to text entry using numeric keys. Because a number sequence potentially maps to more than one word in the dictionary, the improved single-tap approaches that have been described may map a number sequence to a very rare word. This means that spell checking does not even occur to determine whether, for example, the number sequence corresponds to a misspelling of a more common word. Current spell checking approaches operate on the letters of a word, and do not take into account the number sequence that the user has entered using the numeric keys under the single-tap approach. For these reasons, as well as other reasons, there is a need for the present invention.

SUMMARY OF THE INVENTION

The invention relates to spell checking an intended word corresponding to a number sequence entered by the user using numeric keys, or to any key sequence entered on a keyboard with multiple outputs mapped ambiguously to a single key. Most of the numeric keys are mapped to three or four letters. For example, the two key is usually mapped to the letters A, B, and C. The user uses a single-tap approach to enter a number sequence corresponding to an intended word. For example, the user may intend to enter the word "gel," which has a number sequence 435, but mistakenly enters the number sequence 535. A spell-checking logic, based on the number sequence entered and the number sequence of the word "gel," determines that the word "gel" is likely the word intended by the user, especially where the entered number sequence does not have a likely corresponding word.

The spell-checking approach of the invention is advantageous in situations where text entry is accomplished via numeric keys or other reduced key sets. The spell-checking approach of the invention is based on comparisons of the entered number sequences with number sequences within a dictionary, or number sequences for words within a dictionary. This is in comparison with standard spell-checking approaches, which do not base their comparison on number sequences, but instead on the letters of words. Words in the dictionary having costs according to a metric not greater than a maximum cost are presented as the potential intended word of the user. The spell-checking approach of the invention provides for appropriate spell checking in the context of text entry via numeric key input, where standard spell checking does not work well, if at all.

Methods and devices of varying scope are encompassed by the invention. Other aspects, embodiments and advantages of the invention, beyond those described here, will become apparent by reading the detailed description and by referencing the drawings. The invention is substantially described with respect to a numeric keypad. However, the invention itself is applicable to any set of reduced keys, referred to generally as a reduced keypad. A reduced keypad is defined non-restrictively as a number of keys, where each of one or more of the keys is mapped to, or corresponds to, more than one letter. For example, a numeric keypad is a reduced keypad, because typically most of the number keys are mapped to three or four different letters.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, electrical, and other changes may be made without departing from the spirit or scope of the present invention. The following detailed description is, therefore, not to be taken in a limiting sense, and the scope of the present invention is defined only by the appended claims.

Overview

Figure 1:
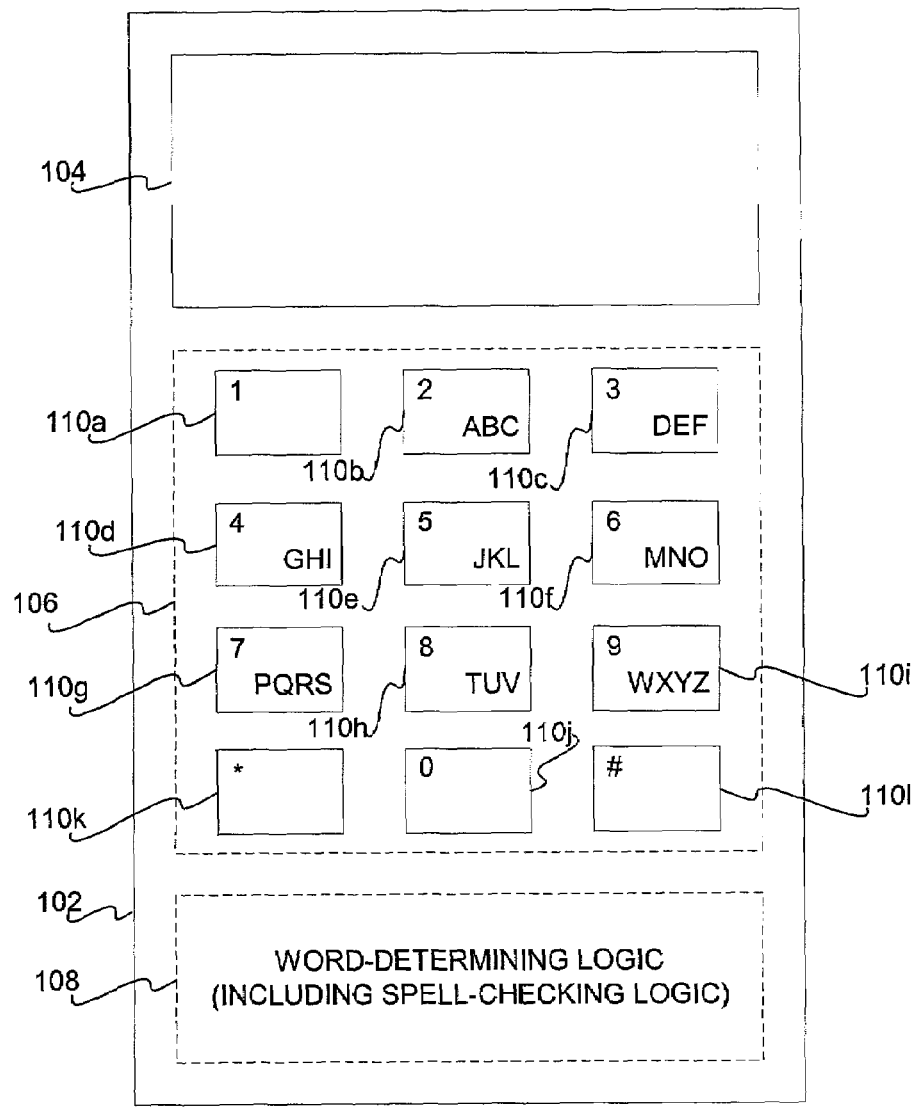
FIG. 1 is a diagram of an example device apparatus according to an embodiment of the invention.

FIG. 1 is a diagram 100 showing an example device 102 according to an embodiment of the invention. The device 102 can be a telephone, such as a mobile phone, a cordless phone, a corded phone, a radio phone, or another type of telephone. The device 102 can also be a device other than a telephone. For example, the device 102 may be a computer, such as a desktop computer, a laptop computer, a handheld computer, or another type of computer. As another example, the device 102 may be a handheld device such as a personal-digital assistant (PDA) device, a remote control, a pager, or another type of device.

The device 102 has at least a display 104, a (typically numeric) keypad 106, and a word-determining logic 108. The device 102 may have other components besides those shown in FIG. 1. The display 104 is used to convey information visually to the user. This information can include visual feedback regarding the entry the user is effecting by pressing keys on the numeric keypad 106. The display 104 is typically a small, flat display, such as a liquid crystal display (LCD). However, the display 104 can also be a larger display, such as a cathode-ray tube (CRT) display, or another type of larger display, such as a larger LCD or other flat-panel display (FPD).

The numeric keypad 106 includes a number of numeric keys, as well as other types of keys. In general, the numeric keypad 106 is distinguished from a standard keyboard in that it does not have a unique key for each letter. As such, the numeric keypad 106 is referred to as having a reduced or a limited set of keys. In particular, the numeric keypad 106 has the following number keys: a one key 100a, a two key 110b, a three key 110c, a four key 110d, a five key 110e, a six key 110f, a seven key 110g, an eight key 110h, a nine key 110i, and a zero key 110j. The numeric keypad 106 also has an asterisk key 110k, and a pound sign key 110l. The numeric keypad 106 may also have other specialized keys beyond those shown in FIG. 1. The layout of the keys of the numeric keypad 106 as shown in FIG. 1 is typical of that found on most telephones, such as mobile phones. The keys of the numeric keypad 106 may be real, physical keys, or virtual, soft keys displayed on the display 104, where the display 104 is a touch-sensitive screen.

All of the number keys of the numeric keypad 106, except for the one key 110a and the zero key 110j, correspond to three or four letters of the alphabet. The two key 110b corresponds to the letters A, B, and C. The three key 110c corresponds to the letters D, E, and F. The four key 110d corresponds to the letters G, H, and I. The five key 110e corresponds to the letters J, K, and L. The six key 110f corresponds to the letters M, N, and O. The seven key 110g corresponds to the letters P, Q, R, and S. The eight key 110h corresponds to the letters T, U, and V. Finally the nine key 110i corresponds to the letters W, X, Y, and Z. That a given number key corresponds to three or four specific letters means that the number key is pressed one or more times by the user to signify input of any of the specific letters.

In the context of the invention, the user uses the numeric keys of the numeric key 106 to enter a number sequence corresponding to a word using the single-tap approach. For each letter the user wishes to enter, the user presses the numeric key corresponding to the letter. For example, to enter the word "hello," the user presses the four key 110d, the three key 110c, the five key 110e twice, and the six key 110f, in succession. Because the number sequence entered, 43556, may correspond to other words than the word "hello," the intended word is ambiguous. The device 102 therefore employs a word-determining logic 108 to disambiguate the word. The logic 108 is designed to determine the word or words corresponding to numeric key input entered by the user on the numeric keypad 106.

The logic 108 can make this determination based on the context of the numeric key input. The logic 108 examines the words, or their corresponding number sequences, that have already been entered to the left and/or the right of the current numeric key input to assist in determining what word the user intended to enter with the current numeric key input. The logic 108 may display the results of its determination on the display 104. The logic 108 uses in general a machine learning approach to determine the word corresponding to the current numeric key input based on the context. The word-determining logic 108 can be implemented as a computer program stored on a computer- or machine-readable medium such as a memory, and executed by a processor.

The word-determining logic 108 preferably includes a spell-checking logic. The spell-checking logic corrects spelling errors given the unique nature of reduced-key text input. For example, a given key combination may correspond to a common misspelling of a word, or the user may have mistyped one number key for another number key. This is a more difficult spelling error to detect than typical spelling errors entered using standard keyboards, because it is more difficult to discern what word the user had intended to enter. The spell-checking logic examines misspellings directly on the number sequence entered, instead of converting the number sequence to a letter sequence, and then examining misspellings. The spell-checking logic may be separate from the word-determining logic 108.

Specifically, the spell-checking logic uses a dictionary, that may or may not be the same as a vocabulary used by the word-determining logic 108 to determine the word corresponding to the numeric key input entered by the user. The dictionary is stored preferably as a tree, or a directed acyclic graphic (DAG) model. The model is then searched, such as recursively, to determine a cost between the entered number sequence and the number sequence for each word in the dictionary. The cost is a similarity measure between the entered number sequence and the number sequence for a word in the dictionary, indicating how similar the sequences are to one another. The cost can be a metric similarity measure that measures a real-valued difference function over the number sequences.

The real-value difference function, d, can be used to measure the cost, and preferably satisfies the following conditions:

1) $d(n,n') \geq 0$

2) $d(n,n')=0 \Leftrightarrow n=n'$

3) $d(n,n')=d(n',n)$

4) $d(n,n')+d(n',n'') \geq d(n,n'')$ (1)

The term d(n, n') indicates the cost between the entered number sequence n, and the number sequence for a word in the dictionary n'. The first condition indicates that the cost between the number sequences n and n' must be non-negative. The second condition indicates that if the cost between the two number sequences is zero, then the sequences are identical. The third condition is the commutative property, indicating that comparing the entered numbered sequence n to the number sequence for a word in the dictionary n' yields the same cost as comparing the sequence n' to the sequence n. Finally, the fourth condition indicates that for number sequences for two words in the dictionary n' and n", the cost between the two sequences and the cost between the sequence n and one of the sequences is greater than the cost between the sequence n and the other of the sequences.

One real-value difference function that can be used is the known minimum edit distance. The minimum edit distance is an agglomerative measure of similarity with respect to the entered number sequence $n=n_1n_2 \ldots n_i$, and the number sequence for a word in the dictionary $n'=n'_1n'_2 \ldots n'_j$. The entered number sequence n has i digits, whereas the number sequence for a word in the dictionary n' has j digits. The minimum edit distance is defined recursively as follows:

$$d(0, 0) = 0 \qquad (2)$$

$$d(i, j) = \min \begin{bmatrix} d(i, j-1) + 1, \\ d(i-1, j) + 1, \\ d(i-1, j-1) + v(n_i, n'_j) \end{bmatrix}$$

where $$v(n_i,n'_j)=0 \Leftrightarrow n_i=n'_j \qquad (3)$$

$$v(n_i,n'_j)=1 \Leftrightarrow n_i \neq n'_j$$

General Approach for Spell Checking

Figure 2:
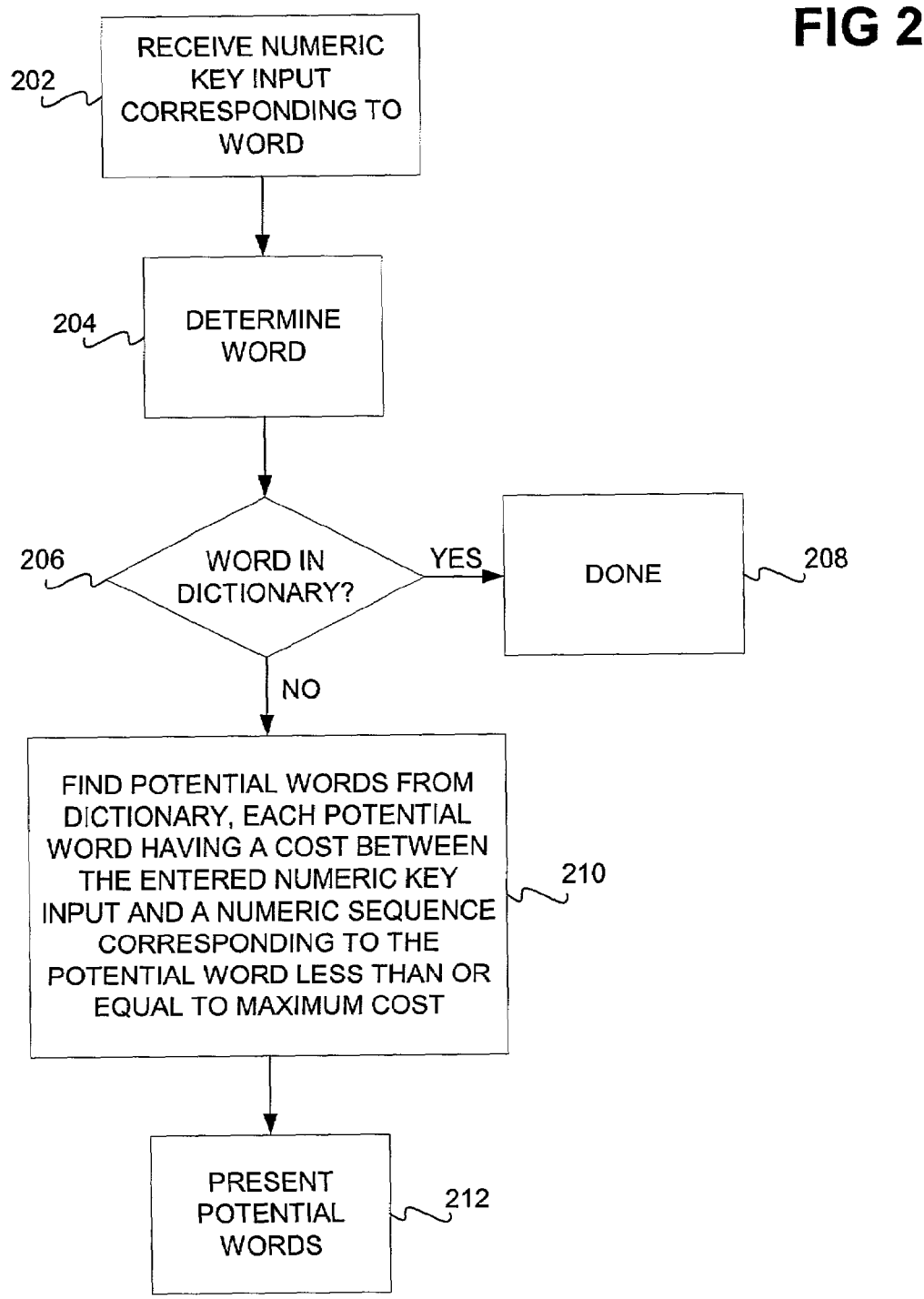
FIG. 2 is a flowchart of a method summarizing the invention.

FIG. 2 shows a flowchart of a method 200 that presents the overall spell-checking approach followed by one embodiment of the invention. In 202, numeric key input corresponding to a word is received. The input may have a context. In 204, the word is determined, for example, by the word-determining logic 108 of the device 102 of FIG. 1. If the word determined in 204 is in the dictionary used by the spell-checking logic, then the method proceeds from 206 to 208, where the method is finished. This is because the spell-checking logic may not be necessary in all embodiments of the invention where the word corresponding to the entered numeric key input can be unambiguously determined to some degree.

Alternatively, the spell-checking logic may always be invoked, for example, to determine if the probability that the numeric key input corresponds to a misspelled word is greater than the probability that the numeric key input corresponds to the word determined in 204 or to add the word to a list of possible words for the user to select from. The word determination performed in 204 and the resulting checking in 206 may be optional, and the method 200 proceeds directly from 202 to 210. One alternative embodiment that always invokes the spell-checking logic is described in a succeeding section of the detailed description.

In 210, assuming that the numeric key input likely corresponds to a misspelled word, one or more potential words that may be the correct word intended by the user are found. 210 is performed by the spell-checking logic. Each word in the dictionary is examined, and those words having number sequences that have a cost as compared to the entered numeric key input less than or equal to the maximum cost are saved as potential words. In 212, the potential words found are presented to the user, from which the intended word can be selected.

Figure 3:
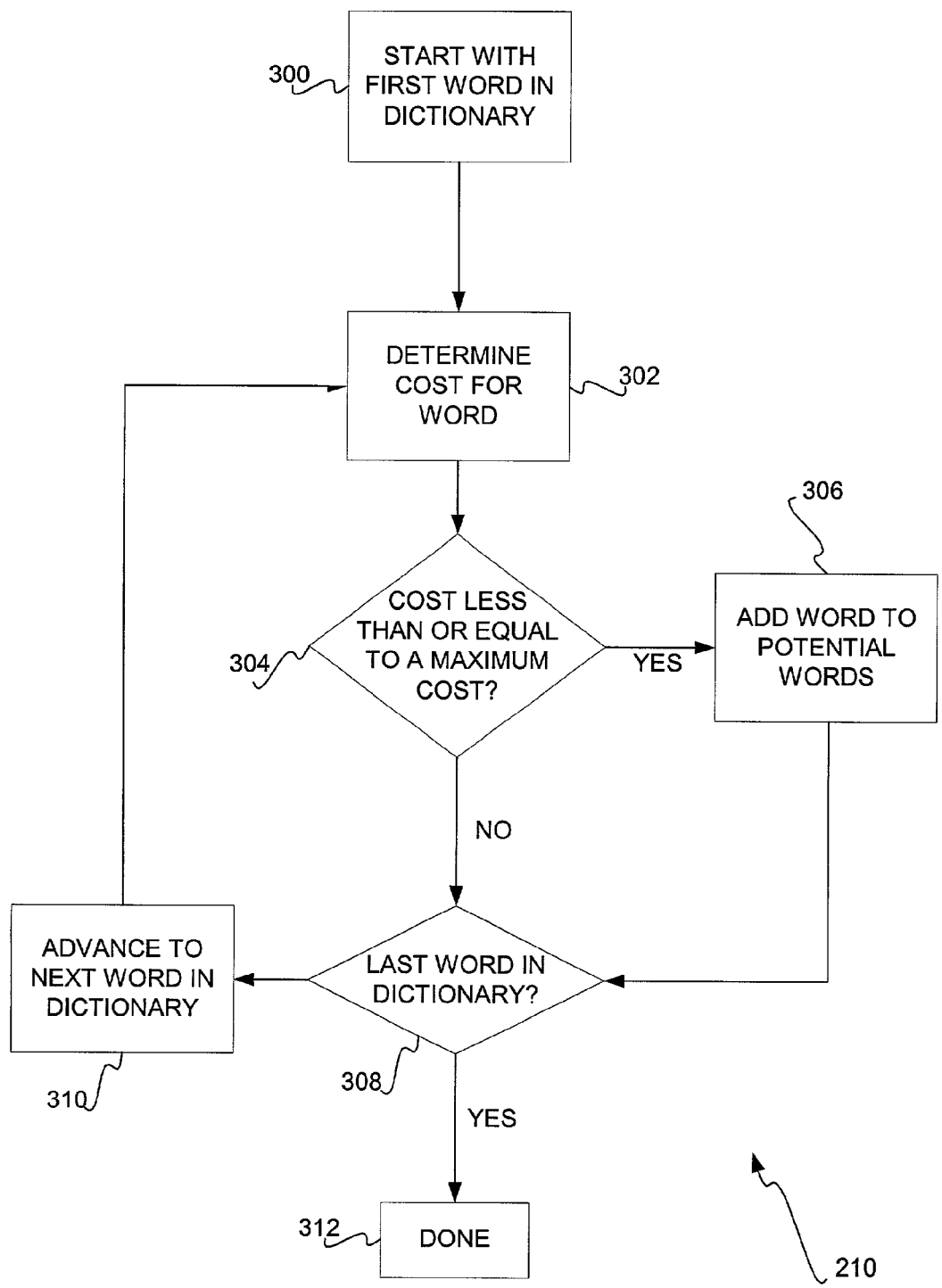
FIG. 3 is a flowchart of a method showing how one embodiment implements the spell checking of FIG. 2.

FIG. 3 is a flowchart of a method showing how one embodiment in particular searches for potential words in 210. The method starts with the first word in the dictionary in 300. The cost for the number sequence for this word, relative to the entered numeric key input, is determined in 302. If the cost for the number sequence for this word is less than or equal to the maximum cost, then the method proceeds from 304 to 306, where the word is added as a potential intended word. Otherwise, the method proceeds from 304 to 308, to which the method also proceeds from after adding the word as a potential word in 306. In 308, if the word is the last word in the dictionary, then the method proceeds to 312, where it is finished. Otherwise, the next word in the dictionary is advanced to in 310, and the method proceeds relative to this new word in 302.

Figure 4:
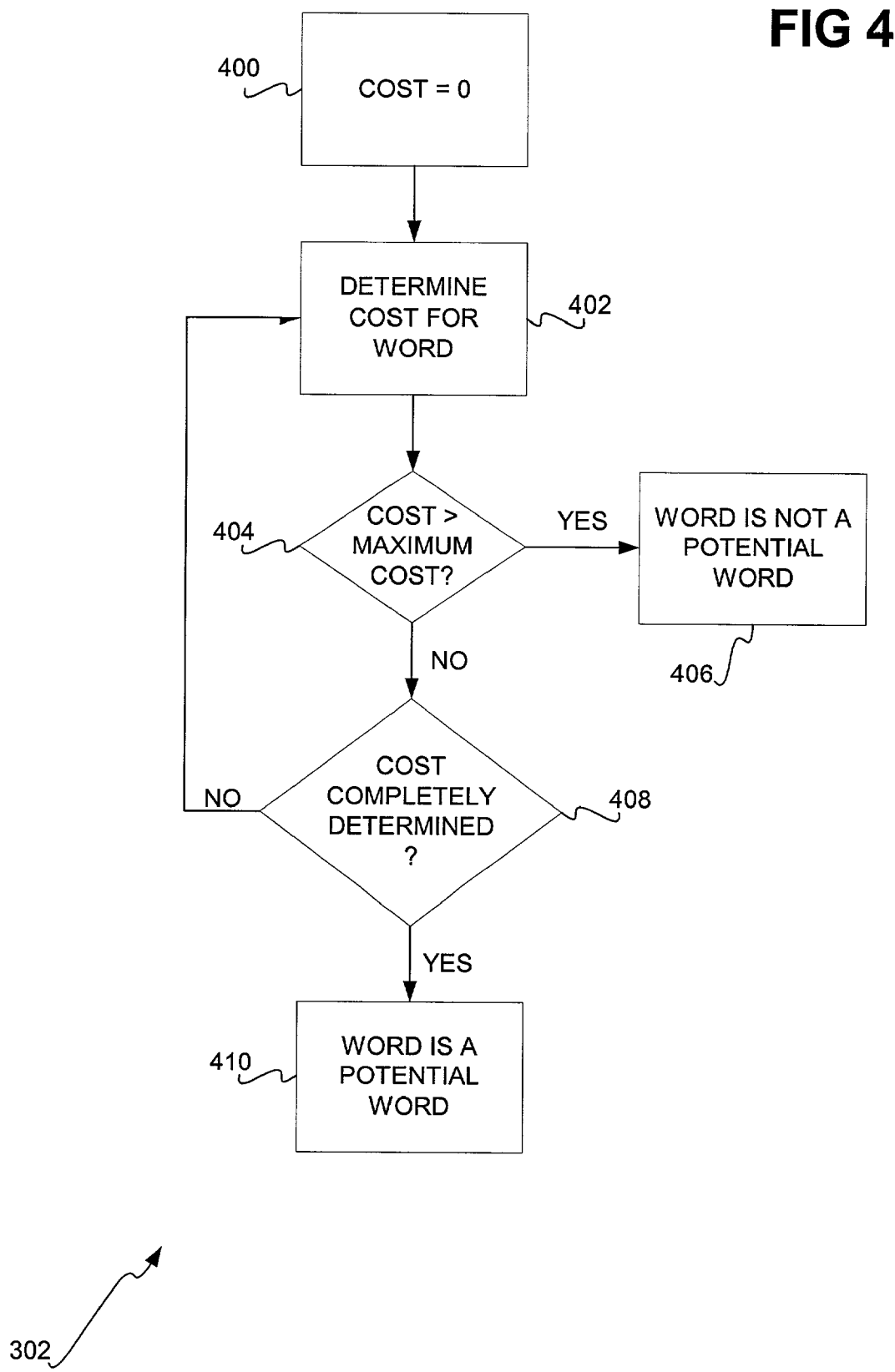
FIG. 4 is a flowchart of a method showing how one embodiment implements the cost determination for a word of FIG. 2.

The cost determination of 302 of the number sequences for all of the words relative to the entered numeric key input can be performed by a dynamic programming approach navigating a constructed tree or directed acyclic graph in a recursive manner. An overview of such a cost determination in 302 relative to a number sequence for a single word in the dictionary as compared to the entered numeric key input is shown in the method of the flowchart of FIG. 4. In 400, the cost is initially set to zero. The method is then recursively followed for each number of the number sequence of the word, relative to the corresponding number of the entered numeric key input.

For instance, in 402, the cost is first determined for the first number of the number sequence relative to the first number of the entered numeric key input. If the numbers are the same, the cost is zero, while if they differ, the cost may be one or greater, depending on the weight associated with the appropriate edge in the directed acyclic graph. In 404, once the cost exceeds the maximum cost allowed, then the recursion aborts for this word in 406, where it is concluded that the word corresponding to the number sequence under examination is not a potential word for the intended word of the user.

If the cost does not yet exceed the maximum cost, then in 408 it is determined whether the cost has been completely determined. That is, the method in 408 determines whether all of the numbers of the number sequence for the word have been compared with their corresponding numbers of the entered numeric key input. If not, then the cost is potentially increased by comparing the next number of the number sequence with the next number of the entered numeric key sequence, by proceeding back to 402. If the method has determined that the cost of the number sequence as compared to the entered numeric key sequence is less than or equal to the maximum cost allowed, and the cost has been completely determined, then the method ultimately finishes by proceeding from 408 to 410. In 410, the word having the number sequence that has been compared to the entered numeric key input is deemed a potential intended word by the user.

Contextual Approach for Word Determination

The spell checking approach described in the previous sections of the detailed description is a general approach that can be used with any type of text input using numeric keys. In a specific case, the word-determining logic 108 of the device 102 of FIG. 1 determines the word based on the context in which the word was entered. The spell-checking logic in this embodiment is integrated with the word-determining logic 108, such that spell checking is integrated with word determination. Prior to the description of this integration in the next section of the detailed description, the manner by which word determination can be accomplished contextually is presented in this section of the detailed description.

As an example of the type of determination performed by the logic 108, the user may have already entered the words "The situation has run," and is currently entering a word corresponding to the number sequence 2665. The number sequence 2665 corresponds to at least two words, "amok" and "bonk." In the context of the words already entered by the user, the word-determining logic 108 may likely select the word "amok" as the intended word of the user, and not the word "bonk." In the context of the previously entered words to the left of the entered sequence, referred to as the left context of the current number sequence, the word "amok" is more likely to occur than the word "bonk." However, if the user has already entered the words "With the ball I shall," and then enters the number sequence 2665, the word-determining logic 108 may likely select the word "bonk" instead of the word "amok." In this case, in the left context of the number sequence entered, the word "bonk" is more likely to occur than the word "amok." The word-determining logic 108 selects a word not only by considering the current number sequence, but also the context in which the current number sequence has been entered.

In the examples of the previous paragraph, the context was referred to as the left context. More specifically, the left context of a current number sequence refers to all the words and/or number sequences to the left of the current number sequence. The word-determining logic 108 may also consider the right context of the current number sequence. The right context of the current number sequence refers to all the words and/or number sequences to the right of the current number sequence. Word determination based on the right context may come about in one of two situations. First, the user may have already entered a number of words, and is inserting a word within the words already entered. In this situation, the specific number sequence entered by the user has a right context in addition to a left context. Second, the user may enter in a number of number sequences corresponding to words, such that the logic 108 does not resolve the sequences into words until the user has finished entering the sentence. In this situation, each number sequence except for the last sequence has a right context.

Alternatively, the logic 108 may continually reevaluate the determined word based on additional words the user enters. For example, the user may intend to enter the sentence "The ball is what I kicked." Up until the user enters the number sequence corresponding to the word "kicked," the word-determining logic 108 may select the word "call" for the number sequence 2255, instead of the word "ball." However, the logic 108 may continually reevaluate all words based on new words entered. Once the user enters the number sequence corresponding to the word "kicked," the logic 108 may go back and select the word "ball" for the number sequence 2255, instead of the word "call." In general, the logic 108 can use the left context of the current number sequence, the right context of the current sequence, or both the left and the right contexts, which is also referred to as double-sided context.

In addition, the word-determining logic 108 may determine a word based on the number sequence entered by the user as corresponding to an initial part of the word, and not the complete word. As an example, the user may be entering the words "good enough." When the user has pressed the numeric keys corresponding to all except the last letter of the word "enough," which is the number sequence 36684, the word-determining logic 108 may be able to determine that the user is entering the word "enough." This is even though the user has not pressed the four key a final time to enter the letter H. Note that the user could have intended to enter the words "good ennui," but it is significantly more likely that the number sequence 36684 corresponds to all except the last letter of the word "enough," and not the complete word "ennui."

As has been indicated, the word-determining logic 108 uses a machine learning approach to determine the word corresponding to an entered number sequence based on the context of the sequence. In general, machine learning refers to a system capable of the autonomous acquisition and integration of knowledge. This capacity to learn from experience, analytical observation, and other mechanisms, results in a system that may continuously self-improve and thereby offer increased efficiency and effectiveness. More succinctly, a machine learning approach is an approach that improves automatically through experience.

One type of machine learning approach that can be used is a statistical language model. Generally, a language model estimates the probability of a sequence of language units, such as words. For example, if $\omega$ is a specified sequence of Q words, $$\omega = \omega_1, \omega_2, \ldots, \omega_Q \qquad (4)$$

then the language model estimates the probability $p(\omega)$. This probability is equal to $$p_N(\omega) = \prod_{i=1}^{Q} p(\omega_i | \omega_1, \omega_2, \ldots, \omega_{i-1}) \qquad (5)$$

Assuming that the probability of each word depends only on the previous N words, this can be approximated by $$p_N(\omega) = \prod_{i=1}^{Q} p(\omega_i | \omega_{i-n+1}, \omega_{i-n+2}, \ldots, \omega_{i-1}) \qquad (6)$$

which is known and referred to as an n-gram language model, where n is greater than or equal to 1. In general, these probabilities are evaluated by occurrence counting in any type of database, such as a database of magazine articles, books, newspapers, or another type of database. In general, n-gram language models are impractical except for the cases where n is 1, 2, or 3. Where n is 2, the n-gram language model is more specifically referred to as a bigram language model. Similarly, where n is 3, the n-gram language model is more specifically referred to as a trigram language model.

An n-gram language model can therefore be the machine learning approach used by the word-determining logic 108 to determine the intended word corresponding to a number sequence entered by the user with the numeric input keys of the numeric keypad 106. That is, an n-gram model can be used to examine the previous n-1 words to determine the current, nth, word corresponding to the current number sequence. An n-gram model is generally constructed by examining a database, or training corpus. The model can be improved over time by retraining the model with more complete databases, or by considering what the user has him or herself specifically entered in the past. The latter is referred to as using a cache model, where the last x words entered are stored in a cache.

Integration of Contextual Word Determination with Spell Checking

Figure 5:
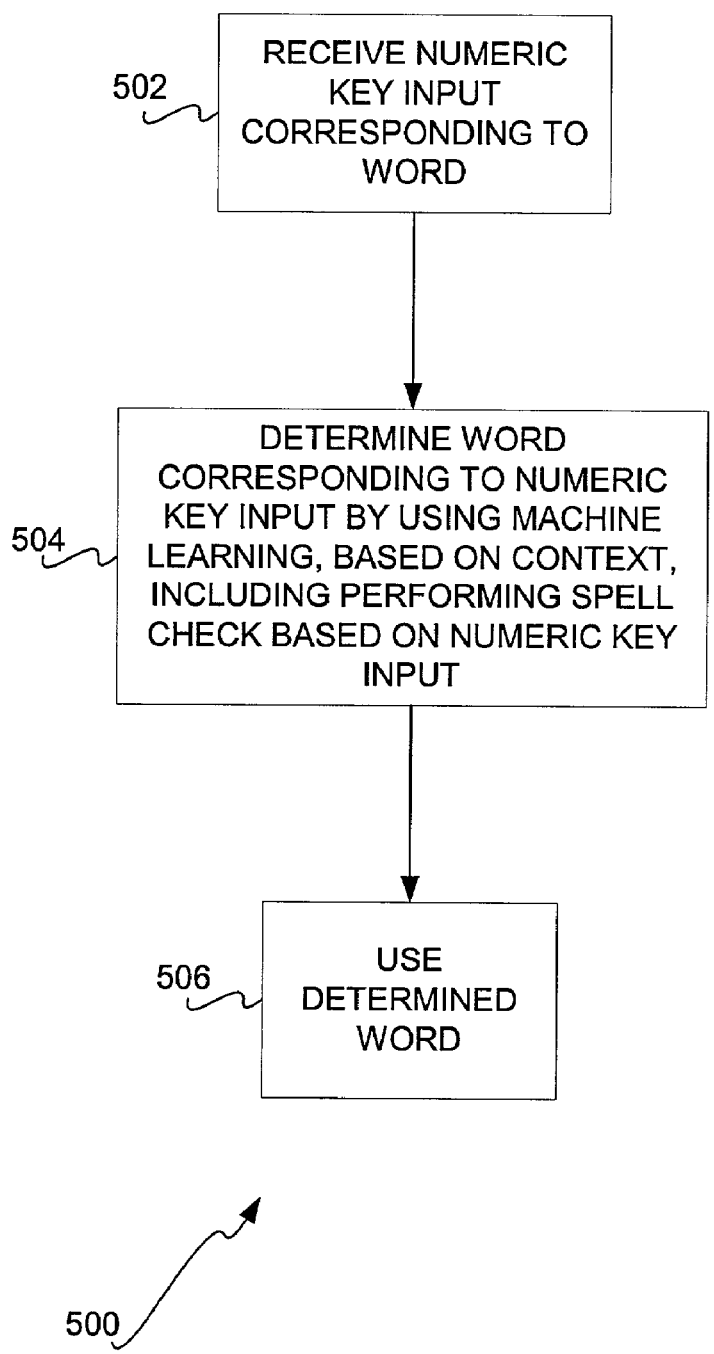
FIG. 5 is a flowchart of a method showing how one embodiment integrates spell checking with word determination given the context in which the word has been entered.

FIG. 5 is a flowchart of a method 500 showing an overall approach performed by one embodiment to determine the word corresponding to the numeric key input entered by the user based on the context of the input. This approach integrates the spell-checking approach that has been described. The method 500 can be performed by the device 102 of FIG. 1. In 502, the device 102 receives numeric key input corresponding to a word, where the input has a left context, a right context, or both. In 504, the device 102, and more specifically the word-determining logic 108 of the device 102, determines the word corresponding to the numeric key input. The logic 108 makes this determination by using a machine learning approach, based on either the left context, the right context, or both, of the numeric key input. The logic 108 also incorporates the spell-checking logic to perform a spell check based on the numeric key input. For example, for a given entered numeric key input, a potential word determined by the spell-checking logic may be more likely as the intended word of the user than the word determined by the word-determining logic 108. In such an instance, the potential word would then be the determined word of 504. In 506, the device 102 may use the word determined in 504.

Figure 6:
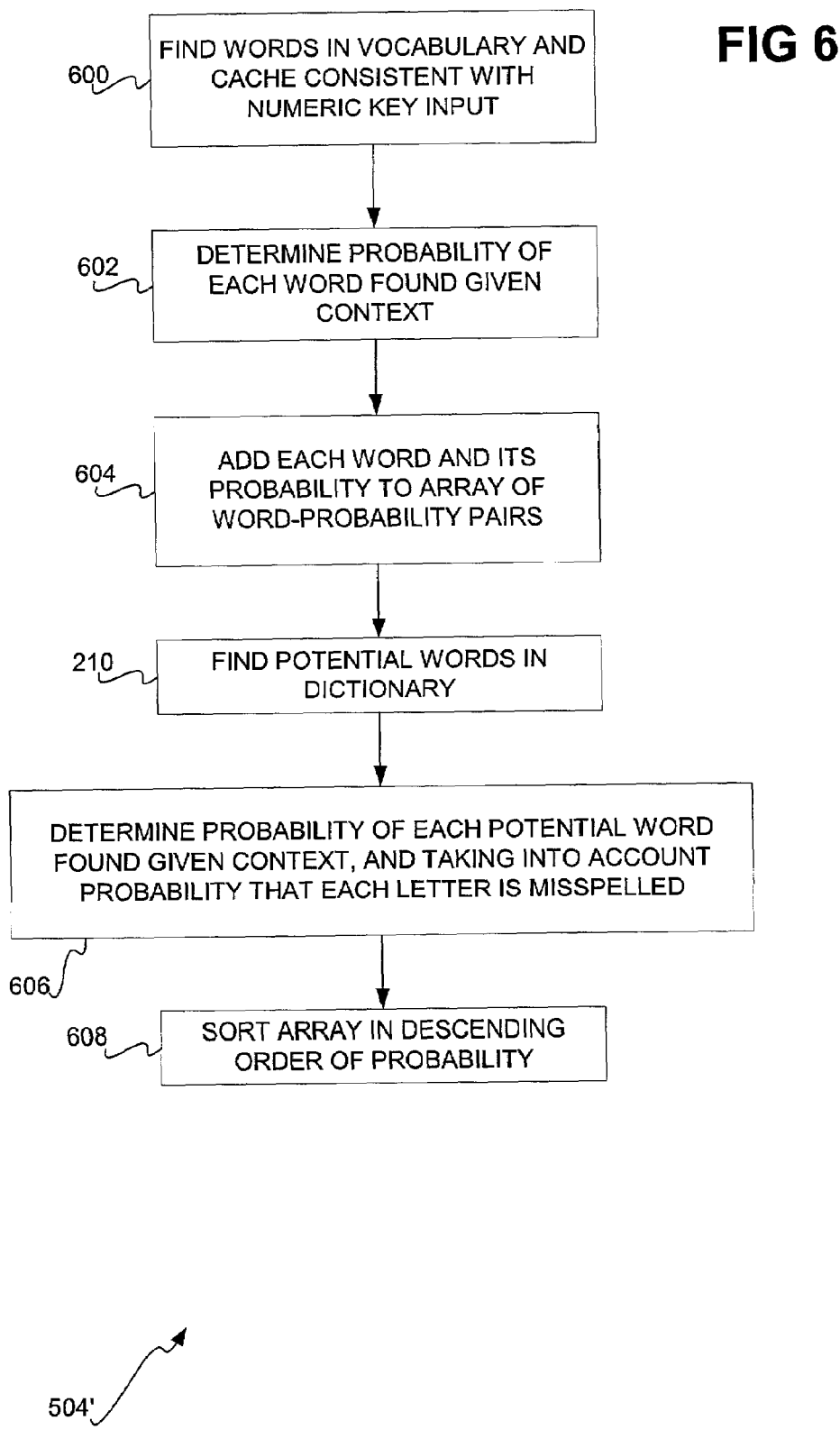
FIG. 6 is a flowchart of a method showing how one embodiment implements the spell checking of FIG. 5.
Figure 7:
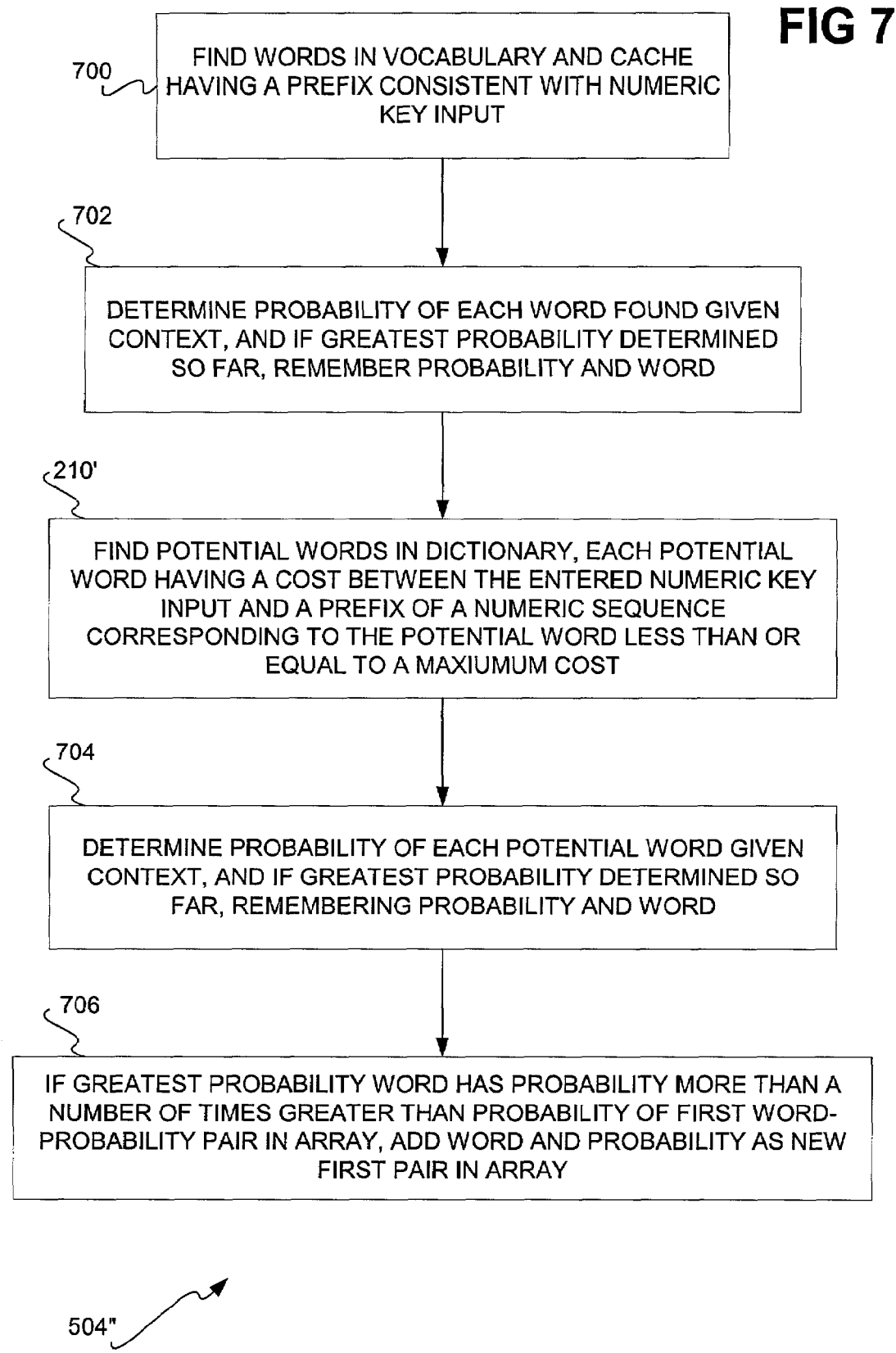
FIG. 7 is a flowchart of a method showing how another embodiment implements the spell checking of FIG. 5 in addition the embodiment of FIG. 6.

The manner by which the word determination performed by the word-determining logic 108 is integrated with the spell checking performed by the spell-checking logic is described by reference to the flowcharts of FIGS. 6 and 7. FIGS. 6 and 7 implement an n-gram language model for word determination based on left context, with integrated spell checking. FIG. 6 is a flowchart of a method in which word determination is integrated with spell checking, where only complete words are considered. For example, where the user has thus far entered the number sequence 435, the method of FIG. 6 determines the likelihood that the user is intending to enter three-letter words, such as the word "gel." FIG. 7 is a flowchart of a method in which word determination is integrated with spell checking, where partial words are considered. For example, where the user has thus far entered the number sequence 435, the method of FIG. 7 determines the likelihood that the user has entered the first three letters of a longer word, such as the word "hello," which has the number sequence 43556. The method of FIG. 6 can be performed by itself as 504 of FIG. 5, such that the method of FIG. 6 is indicated as the method 504'. The method of FIG. 7 can also be performed after the method of FIG. 6 is performed, as 504 of FIG. 6, where the method of FIG. 7 is indicated as the method 504".

Referring first to FIG. 6, in 600, all the words within a predetermined vocabulary that are consistent with the numeric key input are found. This is based on the assumption that the user entered the correct numeric key input for the correct spelling of the intended word. In addition, the words within a cache, where a cache model is being used in addition to the n-gram language model, that are consistent with the numeric key input can be found. The cache stores the last x number of words that the user has entered, in order of entry. In 602, the probability of each word found in 600, given the left context of the numeric key input relative to the words or number sequences already entered, is determined.

The probability is determined is based on an n-gram modeling approach, such as a bigram or a trigram modeling approach.

For example, the user may have already entered the word "run," and the word "amok" is consistent with the number sequence next entered by the user. Within a training corpus of a million words, the word "run" may appear a thousand times, and the phrase "run amok" may appear once. Thus, the probability of seeing "amok" given that the preceding word is "run" is $\frac{1}{1000}=0.001$. Because of smoothing issues, the estimated probability is, however, likely to be slightly different. Note that without using an n-gram model, the frequency of use of the word "amok" by itself would have been p(amok) by itself, or $$\frac{1}{1,000,000}.$$

In 604, each word found in 600, and that had its probability determined in 602, is added to an array of word-probability pairs. For example, the word-probability pair for the word "amok," based on the previous paragraph, is (amok, 0.001).

Alternatively, it can be more efficient to combine 606 and 600 in FIG. 6, because exact matches to words in the dictionary may be found as part of the search for words that are near matches to words in the dictionary. For example, in the pseudo-code for the search function provided in a succeeding section of the detailed description, only a single search is done. This search combines the search for exact whole matches, misspelled whole match, exact truncation matches, and misspelled truncation matches.

The method 504' of FIG. 6 proceeds from 604 to 210, where spell checking is performed by finding all potential words in a dictionary. The spell checking assumes that the entered numeric key input is to some degree the incorrect number sequence for the correct spelling of the intended word, or the correct number sequence for the incorrect spelling of the intended word. The dictionary may be the same set of words used as the vocabulary in 600, or a different set of words. Each word in the dictionary is examined. Those words having number sequences that have a cost as compared to the entered numeric key input less than or equal to the maximum cost are saved as potential words. The cost can be the minimum edit distance, where the allowed maximum cost, or distance, is preferably two.

In 606, the probability of each potential word, given the context of the potential word, is determined. This determination is similar to the determination performed in 602, except that it takes into account a probability that each letter of the intended word is misspelled. This probability can be 0.0005, for example. To determine the probability p(potential word, entered numeric key input|history), independence is assumed between the spelling mistakes and the history, such that the probability is determined as p(potential word|history)◆p(entered numeric key input|potential word). For the probability p(entered numeric key input|potential word), an approximation of 0.0005 to the power of the minimum edit distance between the entered numeric key input and the number sequence corresponding to the potential word is used. It is noted that more accurately, this should be then multiplied by (1—0.0005) to the power of the number of numbers within the number sequence corresponding to the potential word, but this term is close enough to 1 to be neglected. The potential word and its determined probability are then added to the array.

The probability determination of 606 can also take into account a small word penalty. Users are less likely to misspell shorter words, and there tend to be very many possible misspellings for short words, especially if allowing for insertions and deletions. Therefore, whenever the numeric key input includes a small number of digits, such as four or less, the penalty for a misspelling is doubled, such that the penalty in the probability space is squared. As an example, the probability of 0.0005 noted in the previous paragraph would increase to $0.0005^2$, or, 0.00000025.

The probability determination of 606 may also take into account an insertion penalty for the last letter, as double that of the penalty for the other letters. Similar to the small word penalty, the probability of 0.0005 would then be squared to 0.00000025. Without this extra penalty, the user may encounter a disconcerting situation. For example, the user may intend to enter the word "barely" using the numeric keys. After entering the number sequence for the prefix "bare," the word "bare" may be displayed to the user. However, once the user enters the next number corresponding to the letter L, an exact match to the word "barel" may not be found. Therefore, the logic may instead determine that the user had entered the word "bare" and then incorrectly entered the letter L. The word "bare" is still displayed to the user, who may assume that, for example, he or she did not press the number key for the letter L hard enough. Doubling the penalty for the last letter discourages the logic from making the same choice twice, but does not prevent it from doing so. As an example, if the user enters in the word "enoughp" using the numeric keys, the logic still discerns the word "enough." This is because, even with the doubled penalty, an insertion error is still the most likely choice.

The probability determination of 606 may also take into account a deletion penalty for the last letter, as double that of the penalty for the other letters. Similar to the insertion penalty, the probability of 0.0005 would then be squared to 0.00000025. Without this extra penalty, the user may encounter a disconcerting situation. For example, the user may intend to enter the word "important" using the numeric keys. After entering the number sequence for the prefix "impor" the word "import" may be displayed to the user, with the system thinking the "t" had been deleted, if there is no likely exact match to the number sequence for "impor". The user may find the addition of this extra letter confusing or disconcerting, and may think they have entered the number for "t" when in fact they have not. Doubling the deletion penalty for the last letter discourages the logic from completing the word too early, but does not prevent it from doing so. If a user enters the word "misspell" but misspells it as "misspel", the system will be discouraged from displaying "misspell" as the first choice, which could confuse the user, but will still contain it somewhere on the list. Displaying possible truncations of words to the user, and picking a truncation penalty that is less than the deletion penalty, will also have this effect. This is discussed later in the detailed description.

In 608, the array to which word-probability pairs have been added is sorted in descending order of probability. This is one way by which the word-probability pair within the array that has the greatest probability can be determined. The word-probability pair with the greatest probability, after that the array has been sorted in 608, is the first pair within the array. Other approaches may also be used to determine the word-probability pair within the array that has the greatest probability. (A user interface may also wish to display a list of words, sorted in this order.) It is noted that because the array includes word-probability pairs resulting from the words found in 602, as well as from the potential words found in 210, word determination is integrated with spell checking. In 602, the entered numeric key input is assumed to be the correct number sequence for the correct spelling of the intended word. In 210, the entered numeric key input is assumed to some degree be the incorrect number sequence for the correct spelling of the intended word, or the correct number sequence for the incorrect spelling of the intended word.

After the method 504' of FIG. 6 has been performed, the word in the array that has the greatest probability can be selected as the intended word of the user. Alternatively, the method 504" of FIG. 7 can be performed, to take into account that the numeric key input entered by the user may represent an initial part of a word. In 700, the words in the vocabulary, and optionally in the cache as well, that have an initial part, or prefix, that are consistent with the numeric key input are found. The entered numeric key input is assumed in 700 to be the correct number sequence for the correct spelling of the prefix of the intended word. For example, if the user has so far entered the number sequence 36684, the word "enough" may be found, since the first five letters of the word "enough" match the number sequence 36684.

In 702, the probability of each word found in 700 given the left context of the numeric key input relative to the words or number sequences already entered is determined. The probability is determined based on an n-gram modeling approach, such as a bigram or a trigram modeling approach. If the probability for a given word found in 700 is the greatest probability for any word found in 700 so far, then this word-probability pair is remembered, or stored, as the greatest probability word and the greatest probability, respectively.

The method 504" proceeds to 210' from 702, where spell checking is performed by finding all potential words in a dictionary that represent a correct spelling of the prefix of the intended word. The spell checking assumes that the entered numeric key input is to some degree the incorrect number sequence for the correct spelling of the prefix of the intended word, or the correct number sequence for the incorrect spelling of the prefix of the intended word. The process performed in 210' is similar to what has been described in conjunction with 210 in FIGS. 2 and 6, except that prefixes of words are considered, instead of complete words. In this manner, words of which prefixes have number sequences having a cost as compared to the entered numeric key input less than or equal to the maximum cost are saved as potential words. The cost can be the minimum edit distance, where the allowed maximum distance is preferably two.

In 704, the probability of each potential word found in 210', given the context of the potential word, is determined. This determination is the same as the determination performed in 606 of FIG. 6. In particular, the probability p(potential word, entered numeric key input is a [possibly misspelled] prefix of the potential word|history) is determined. Assuming independence between spelling errors and histories, this is equivalent to the probability of the potential word given the history, p(word|history), multiplied by the probability of the entered numeric key input, given that the numeric key input is a prefix of the potential word. There are many possible prefixes for a given word. Therefore, a given probability to the power of the minimum edit distance between the entered numeric key input and any prefix of the potential word is used as an approximation to the probability of the numeric key input being a prefix of the word. The given probability is the probability that each letter has been misspelled, and, as has been noted in the description of 606 of FIG. 6, can be 0.0005. If the probability for a given potential word found in 210' is the greatest probability for any word found in either 210' or 700 so far, then this word-probability pair is remembered as the greatest probability word and the greatest probability, respectively.

In 706, if the greatest probability word is significantly more likely, by its measure of probability, than the word with the greatest probability within the array, then the greatest probability word is used as the intended word in lieu of the word with the greatest probability within the array. Otherwise, the word with the greatest probability within the array is used as the intended word. More specifically, where the array has been sorted in 608 in descending order of probability, if the greatest probability word is significantly more likely than the word of the first word-probability pair in the array, then the greatest probability word-greatest probability pair is inserted at the beginning of the array.

One measure that can be used to determine if the greatest probability word is significantly more likely than the word with the greatest probability within the array is whether the greatest probability word has a probability that is more than a predetermined number of times greater than the word with the greatest probability within the array. For example, the greatest probability word may be significantly more likely if this word has a probability more than one-hundred times that of the word with the greatest probability within the array. In this example, if the greatest probability word is significantly more likely, then the word-probability pair inserted at the beginning of the array is the pair greatest probability word-greatest probability times one hundred.

This constant by which the probability of the greatest probability word is multiplied for comparison with the word with the greatest probability within the array is referred to as the truncation, or partial word, penalty. The inverse of the truncation penalty should be greater than the probability that each letter is misspelled that was taken into account in 606 of FIG. 6 and 704 of FIG. 7. In the examples used, $$\frac{1}{100} = .01$$

is greater than 0.0005, so this condition is satisfied. If the condition is not satisfied, then when the user is typing, the logic may determine, after the user enters the penultimate letter, that it is more likely that the user has deleted the last letter than having entered a truncation. As a result, the logic may complete the word too soon, which can be disconcerting to the user.

When a prefix is the best choice, either the entire word, allowing for word completion and saving keystrokes, can be displayed, or just the letters of the prefix that match may be displayed. For instance, if the preceding word is "good" and the user enters the sequence 36684, which corresponds to "ennui" or "enoug", the system may display "enoug" or "enough". By displaying the former, the display changes less often than if "ennui", was displayed, which may be less disconcerting for the user when the user finally enters an "h". By displaying the latter, however, the user can save keystrokes.

It is noted that because the greatest probability word is determined from the words found in 700, as well as from the potential words found in 210', word determination in the method 504' of FIG. 7 is integrated with spell checking. In 700, the entered numeric key input is assumed to be the correct number sequence for the correct spelling of the prefix of the intended word. In 210', the entered numeric key input is assumed to some degree to be the incorrect number sequence for the correct spelling of the prefix of the intended word, or the correct number sequence for the incorrect spelling of the prefix of the intended word.

Directed Acyclic Graph and Pseudo-Code for Searching

Figure 8:
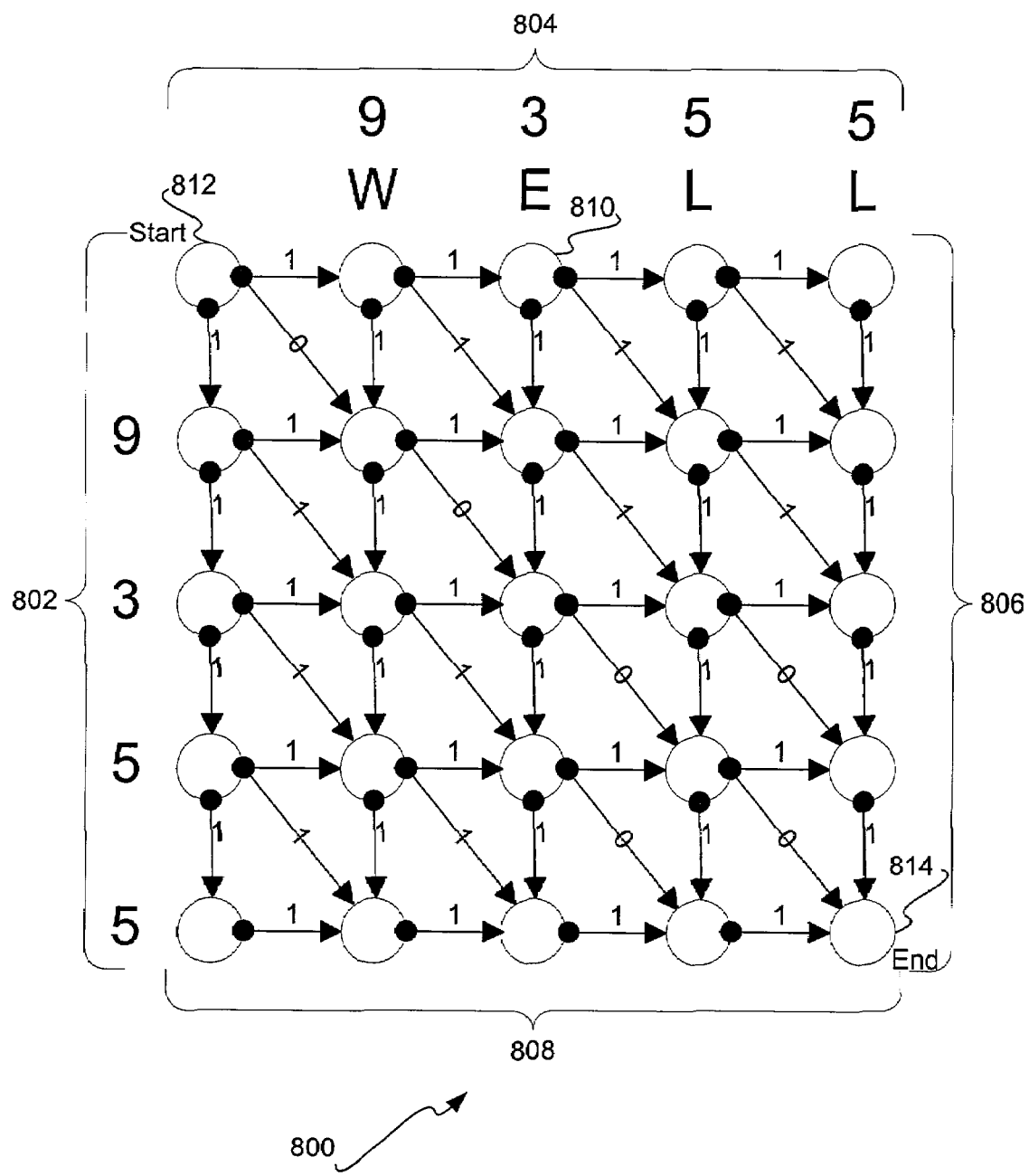
FIG. 8 is a diagram of an example lattice showing the minimum edit distance lattice for the word "WELL" and the numeric sequence 9355.

When using the minimum edit distance as the cost, a measure of similarity between two number sequences is extracted by creating a directed acyclic graph (DAG) for all nodes (i, j), with horizontal and vertical edges weighted one, which is a penalty for a mismatch, and the weights of the diagonal edges determined by v. Because penalties are cumulative, the more dissimilar number sequences will have the longest, shortest paths. An example of such a DAG, or lattice, is shown in FIG. 8. The lattice 800 is between the numeric input sequence 9355, as indicated by the curly brace 802, and a dictionary entry, stored either as a word "WELL," or as its numeric sequence 9355, as indicated by the curly brace 804. The lattice 800 includes a number of nodes organized into rows 806 and columns 808, such as the node 810, the start node 812, and the end node 814. The difference measure, or minimum edit distance, d, satisfies the conditions (1) above, and therefore qualifies as a legitimate metric. Besides the minimum edit distance, non-metric agglomerative similarity measures can also be used. Such measures may be based on, for example, n-gram analysis.

Because the minimum edit distance itself is recursively defined, searching the directed acyclic graph between two number sequences is preferably recursively performed. A maximum distance is established, such that once exceeded, the recursion search stops for a number sequence for a given word in the dictionary compared to the entered number sequence. Preferably, this maximum distance is two. All the words having number sequences with a minimum edit distance of no greater than two from the entered number sequence are potential correctly spelled words for the misspelled word with the entered number sequence. It is noted that traditional letter-based dictionaries can be used with the invention, where substitution or mismatch penalties occur based on different numbers, instead of different letters. For example, where the entered number sequence includes the number 6, if this number is being compared in the graph against a letter, a mismatch penalty will not occur for the letters M, N, and O. This is because each of these letters maps to the number 6. Alternatively, a dictionary can be stored by number sequences for the words, instead of by letters. This is more speed efficient, but less efficient for storage and other purposes, since the number sequence to word mappings still need to be stored.

To search the directed acyclic graph to determine the minimum edit distance, known dynamic programming can be used. Dynamic programming arises where the goal is to enumerate all possible configurations of the given data, and test each one to determine if it is a solution. A table is maintained that contains previously determined configurations and their results. If there are only a small number of distinct configurations, dynamic programming avoids redetermining the solution to these problems repeatedly. With respect to determining the minimum edit distance, dynamic programming can be used to determine the path(s) within the directed acyclic graph.

Pseudo-code for determining the minimum edit distance between a number sequence and a dictionary encoded as letters is now first described and then provided. The dictionary is stored as a tree, such that there is a distinguished root node of the tree, ROOT. Each node of the tree (except the ROOT) contains a letter, indicating that that letter is appended to any path from the root node through that point. A function, LETTER(NODE), indicates this letter. Each node of the tree may contain a "word end marker" indicating that a path from the root node to the current node spells a valid word of the dictionary. There is a Boolean predicate END(NODE) that is true if the node is an end node.

Each node of the tree also contains a possibly empty list of pointers to following (child) nodes. The pointers can be stored in any of many known forms, including pointers to memory, indices into a table, or by laying out the structure in memory such that the number of children is indicated and children follow parents in a known order. There is a function CHILDREN(NODE) that returns an array of pointers to the children. It is further assumed that there is a way to determine the parent node PARENT(NODE) of each node. There need not be an actual pointer to the parent, however. To reach a node from the root, one must travel through the node's parent, so it is usually possible to remember the parent when examining a child.

A function n(LETTER) is defined that returns the number corresponding to a letter. The following function can then be defined:

$$d(ROOT, j) = j \qquad (7)$$

$$d(NODE, j) = \min\begin{bmatrix} d(NODE, j-1) + 1, \\ d(parent(NODE), j) + 1, \\ d(parent(NODE), j-1) + v(n(LETTER(NODE)), n_j) \end{bmatrix}$$

where v is defined the same as before. A depth-first traversal of the tree can be performed, to determine the function d(NODE, j). A particular portion of the tree cannot be searched whenever for some NODE, for all j, d(NODE, j) is greater than some maximum, preferentially 2. LENGTH is set as the length of the entered numeric sequence. Whenever a node of the tree for which END(NODE) is true and d(NODE, length) is less than the aforesaid maximum is observed, the path from the root to this point is recorded as a possible word. Whenever a node of the tree for which d(NODE, length) is observed, the path from the root to this point is recorded as a possible prefix.

The pseudo-code that has been described is provided as a recursive procedure as follows:

```
// Pseudocode for doing spelling correction on a tree:
// note that maxScore can be changed
const maxScore = 2;
Procedure Distance(NODE *parent
                   NODE *self
                   String sequence,
                   Array [0..inputLength] parentScores)
{
    // Note that parentScores[j] = d(parent, j)
    Array<int> myScores;
    // deletion penalty on first letter
    myScores[0] = parentScores[0] + 1;
    // Possible optimization: examine only
    // those elements of myScores such that
    // an appropriate parentScores element is less than maxScore
    for j = 1 to inputLength {
        // Variations include weighting insertion, deletion,
        // substitution differently, or making them dependent
```

-continued

```
// on the actual letters affected.
// Variation: insertionScore might be doubled for last letter
insertionScore = myScores[j-1] + 1;
// Variation: deletionScore might be doubled for last letter
deletionScore = parentScores[j] + 1;
// Variation: store the dictionary as a tree or DAG of numbers
// instead of letters, keeping additional information either
// separately, or in the tree nodes, to convert each numeric
// dictionary entry into a list of one or more words. Main
// change (besides code to extract words) is to definition of
// substitutionScore
substitutionScore = parentScores[j-1] +
                    v(n(LETTER(self), number[j]));
myScores[i] = min(insertionScore,
                  deletionScore,
                  substitutionScore);
}
// Variation: maxScore might be smaller for short words, etc.
if (myScores[inputLength] <= maxScore and END(self)) {
    add sequence (or WORDID(self)) as a possible word with
    probability pow(.0005, myScores [inputLength]);
    // Other code will modify probability by n-gram
    // or other factors.
    // Penalty might be different for short words.
    // Variation: keep only the top 20 or so words, computing
    // penalties etc. at this time.
}
// Variation: maxScore might be smaller for short words, etc.
if (myScores[inputLength] <= maxScore) {
    add sequence (or WORDID(self)) as a possible truncation with
    probability pow(.0005, myScores [inputLength]).
    // Other code will modify probability by n-gram
    // or other factors
    // as well as truncation penalty.
    // Penalty might be different for short words
    // Variation: store only the single best truncation
}
if (some element of myScores <= maxScore) {
    for each child of self {
        call Distance(self, child,
                      sequence + Letter(self), myScores);
    }
}
}
// To evaluate from root, do:
for each child of ROOT {
    call Distance(ROOT, child, "", {0, 1, 2, ..., inputLength});
}
```

This pseudo-code can also essentially be used to search a DAG representation of a dictionary. The pseudo-code may also be modified to search a DAG- or tree-based dictionary where the nodes represent number sequences instead of letter sequences. This advantageously allows for more efficient searches of the tree, because words with the same number sequence can be searched together. However, doing so requires storing additional information to map each terminal number sequence to a list of one or more letter sequences that correspond to it. The storage for this correspondence may be kept either incrementally in the nodes of the tree, or stored in the leaves or terminal nodes only.

CONCLUSION

It is noted that, although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. For example, the methods that have been described can be stored as computer programs on machine- or computer-readable media, and executed therefrom by a processor. Therefore, it is manifestly intended that this invention be limited only by the claims and equivalents thereof.

We claim:

1. A method for spell checking an intended word entered using a reduced keypad, where each of one or more input keys of the reduced keypad is mapped to a plurality of letters, the method comprising:

for an entered key input corresponding to an entered misspelled word and at least one of a left context and a right context,
finding one or more potential non-corresponding words from a dictionary of words based on a cost, where each potential non-corresponding word has a key input that does not match the key input of the entered misspelled word, and wherein the cost between the key input of the entered misspelled word and the non-corresponding potential word is less than or equal to a maximum cost; and
determining a probability for the one or more potential non-corresponding words based on the at least one of a left context and a right context using a language model comprising probability values corresponding to sequences of word N-grams of a natural language, the language model trained in part using words previously entered in a cache;
updating the language model using words entered into the cache; and
presenting at least one of the one or more potential non-corresponding words as the intended word based on probability.

2. The method of claim 1, wherein the reduced keypad is numeric keypad.

3. The method of claim 1, further initially comprising:
receiving the entered key input comprising the entered misspelled word;
determining a list of potential words corresponding to the key input for the entered misspelled word;
determining a probability for each listed word corresponding to the key input for the entered misspelled word based on the at least one of the left context and a right context using the language model and
ranking the corresponding words and the non-corresponding words based on probability to determine the intended word.

4. The method of claim 3, further initially comprising:
determining whether the intended word corresponding to the entered misspelled word is in the dictionary of words; and,
ending the method in response to determining that the word determined is in the dictionary of words.

5. The method of claim 1, wherein finding the one or more potential non-corresponding words comprises:
for each word in the dictionary of words,
determining the cost between the key sequence of the entered misspelled word and the key sequence corresponding to the dictionary word; and,
adding the word to the one or more potential non-corresponding words in response to determining that the cost is less than or equal to the maximum cost but greater than zero.

6. The method of claim 5, wherein determining the cost between the key sequence of the entered misspelled word and the key sequence corresponding to the dictionary word comprises recursively determining the cost until one of a first condition and a second condition is met where the first condition is the cost is so far greater than the maximum cost, and the second condition is the cost has been completely determined as less than or equal to the maximum cost.

7. The method of claim 5, wherein determining the cost between the key input sequence of the entered misspelled word and the key sequence corresponding to the dictionary word comprises employing a dynamic programming approach.

8. The method of claim 1, wherein the cost between the key input of the entered misspelled word and the input key sequence corresponding to the dictionary word is the minimum edit distance between the key input of the entered misspelled word and the input key sequence corresponding to the dictionary word.

9. The method of claim 1, wherein the dictionary is stored as a tree.

10. The method of claim 1, wherein the dictionary is stored as a directed acyclic graph (DAG) model.

11. The method of claim 1, wherein the dictionary is a letter-based dictionary in which each word thereof is stored only by a constituent letter sequence corresponding to the word.

12. The method of claim 1, wherein the dictionary is a key-based dictionary in which each word thereof is stored by at least the key sequence corresponding to the word.

13. The method of claim 1, and further comprising executing a computer program by a processor from a computer-readable medium to perform the steps of finding one or more potential non-corresponding words from a dictionary of words based on a cost; and determining a probability for the one or more potential non-corresponding words based on the at least one of a left context and a right context.

14. A computer-readable medium having instructions stored thereon for execution by a processor to perform a method for determining a word entered using a reduced keypad, where each of one or more input keys of the reduced keypad is mapped to a plurality of letters, the method comprising:
receiving key input corresponding to the word and a left context;
for each word in a vocabulary that is consistent with the key input of the word, determining a probability of the word given the left context using a language model comprising probability values corresponding to sequences of word N-grams of a natural language, the language model trained in part on words entered into a cache, and adding the word and the probability of the word to an array of word-probability pairs;
updating the language model using words entered in the cache;
finding one or more potential words from a dictionary of words, where each potential word has a cost between the entered key input of the word and an input sequence corresponding to the potential word less than or equal to a maximum cost;
determining a probability of each potential word given the left context and taking into account a probability that each letter of the potential word is misspelled, and adding the potential word and the probability of the word to the array; and
determining the intended word corresponding to the key input as a word of a word-probability pair within the array of word-probability pairs having a greatest probability.

15. The medium of claim 14, wherein the reduced keypad is a numeric keypad.

16. The medium of claim 14, wherein determining the word corresponding to the key input comprises:
sorting the array of word-probability pairs in decreasing order of probability; and,
determining the intended word corresponding to the key input as a word of a first word-probability pair within the array of word-probability pairs.

17. The medium of claim 14, the method further initially comprising, for each word in the cache that is consistent with the key input, determining a probability of the word given the left context, and adding the word and the probability of the word to an array of word-probability pairs.

18. The medium of claim 14, the method of further comprising prior to determining the intended word corresponding to the key input:
for each word in the vocabulary that is consistent with the key input as an initial part of the word, determining a probability of the word given the left context, and upon determining that the probability is greater than a greatest probability so far determined, setting the greatest probability to the probability and a greatest probability word associated with the greatest probability to the word;
upon determining that the greatest probability is at least a number of times greater than a word of a first word-probability pair of the array of word probability-pairs, adding the greatest probability word associated with the greatest probability and,the greatest probability a new first word-probability to the array.

19. The medium of claim 18, the method further initially comprising prior to determining the intended word corresponding to the key input, for each word in the cache that is consistent with the key input as an initial part of the word, determining a probability of the word given the left context, and, upon determining that the probability is greater than the greatest probability so far determined, setting the greatest probability to the probability and a greatest probability word associated with the greatest probability to the word.

20. The medium of claim 18, the method further comprising prior to determining the intended word corresponding to the key input:
finding one or more additional potential words from the dictionary, where each additional potential word has a cost between the entered key input and a prefix of a key sequence corresponding to the potential word less than or equal to a maximum cost;
determining a probability of each potential additional word given the left context, and upon determining that the probability is greater than the greatest probability so far determined, setting the greatest probability to the probability of the potential additional word and the greatest probability word associated with the greatest probability to the potential additional word.

21. The medium of claim 14, wherein determining the probability of each potential word further takes into account a small word penalty.

22. The medium of claim 14, wherein determining the probability of each potential word further takes into account a last letter insertion/deletion penalty.

23. The medium of claim 14, wherein the cost between the entered numeric key input and the key sequence corresponding to the potential word is the minimum edit distance between the entered key input and the key sequence corresponding to the potential word.

24. An apparatus comprising:
a plurality of keys, each of one or more of the keys mapped to a plurality of letters, the plurality of keys used to enter key input corresponding to a word and at least one of a left context and a right context;

a word-determining logic comprising:

an ambiguity resolving logic comprising:

a module adapted to generate a list of words, each listed word having a key input sequence identical to the key input sequence of the entered word;

a second module adapted to determine a probability of each listed word based in part on the at least one of the left context and the right context using a language model comprising probability values corresponding to sequences of word N-grams of a natural language, the language model trained in part with words previously entered into a cache;

a third module adapted to update the language model based on words entered into the cache; and a spell-checking logic designed to provide potential alternative words for the entered word corresponding to the key input entered, where the entered word is misspelled, taking into account that the word was entered using the plurality of keys, as opposed to a keyboard having a unique key for each of a plurality of letters.

25. The apparatus of claim 24, wherein the spell-checking logic is further to determine one or more potential words to the entered word where the entered word is not found in a dictionary of words, by at least finding the one or more potential words from the dictionary, each potential word having a cost between the key input of the entered word and an input sequence corresponding to the potential word less than or equal to a maximum cost.

26. The apparatus of claim 24, further comprising a display on which the at least one of the left context and the right context and the entered word corresponding to the key input are displayed.

27. The apparatus of claim 24, wherein the apparatus is a telephone.

28. The apparatus of claim 27, wherein the apparatus is a mobile telephone.

29. The apparatus of claim 27, wherein the apparatus is one of: a cellular telephone, a corded telephone, a cordless telephone, a digital telephone, and a radio telephone.

30. The apparatus of claim 24, wherein the apparatus is one of: a pager, a desktop computer, a laptop computer, a handheld device, a personal-digital assistance (PDA) device, and a remote control device.

31. The apparatus of claim 24, wherein the spell-determining logic comprises a computer program stored on a computer-readable medium for execution by a processor.

* * * * *